(12) United States Patent
Yamamoto et al.

(10) Patent No.: US 7,253,596 B2
(45) Date of Patent: Aug. 7, 2007

(54) POWER SUPPLY APPARATUS CAPABLE OF SUPPLYING A STABLE CONVERTED VOLTAGE

(75) Inventors: Isao Yamamoto, Kyoto (JP); Yoichi Tamegai, Kyoto (JP)

(73) Assignee: Rohm Co., Ltd. (JP)

( * ) Notice: Subject to any disclaimer, the term of this patent is extended or adjusted under 35 U.S.C. 154(b) by 115 days.

(21) Appl. No.: 10/970,757

(22) Filed: Oct. 21, 2004

(65) Prior Publication Data

US 2005/0088856 A1 Apr. 28, 2005

(30) Foreign Application Priority Data

Oct. 23, 2003 (JP) .............................. 2003-363896

(51) Int. Cl.
*G05F 1/40* (2006.01)
(52) U.S. Cl. ..................... 323/281; 323/282; 327/553
(58) Field of Classification Search ........ 323/282–288, 323/272–274, 266, 267; 363/20, 97, 124, 363/16, 98
See application file for complete search history.

(56) References Cited

U.S. PATENT DOCUMENTS 4,146,832 A * 3/1979 McConnell ................. 323/285
6,229,289 B1 * 5/2001 Piovaccari et al. ......... 323/268
7,002,329 B2 * 2/2006 Agari et al. ................ 323/284

FOREIGN PATENT DOCUMENTS

| JP | 2003-009515 | 1/2003 |
|----|-------------|--------|
| JP | 2003-216247 | 7/2003 |

OTHER PUBLICATIONS

Notification of Reason(s) for Refusal for Japanese Patent Application No. 2003-363896 dated Nov. 8, 2005 with partial English translation.
Japanese Office Action for corresponding Japanese Patent Application No. 2003-363896 dated Aug. 30, 2005 with English translation.

* cited by examiner

*Primary Examiner*—Rajnikant B. Patel
(74) *Attorney, Agent, or Firm*—Cantor Colburn LLP (57) ABSTRACT

A power supply apparatus switchably operates an LDO regulator and a DC/DC converter connected in parallel so as to control a battery voltage Vbat from a power supply at a constant output voltage VO. A detected voltage Vs at a shared output terminal shared by the LDO regulator and the DC/DC converter is input to a feedback input terminal and fed back to the LDO regulator and the DC/DC converter. In order to suppress an undershoot occurring when switching from the LDO regulator to the DC/DC converter, a timing signal generating unit supplies a capability switching timing signal to a pre-drive circuit and switches the control capability of the DC/DC converter from a low capability mode at startup to a high capability mode.

13 Claims, 10 Drawing Sheets

| CNTDEAD | PREIN | SW1 | DEAD TIME CONTROL MODE | POWER TRANSISTOR Tr2 |
|---------|-------|-----|------------------------|----------------------|
| 0 | 0 | ON | SHORT | 1 |
| 0 | 1 | OFF | LONG | 0 |
| 1 | 0 | OFF | LONG | 1 |
| 1 | 1 | OFF | LONG | 0 |

POWER SUPPLY APPARATUS CAPABLE OF SUPPLYING A STABLE CONVERTED VOLTAGE

BACKGROUND OF THE INVENTION

1. Field of the Invention

The present invention relates to a power supply apparatus and, more particularly, to a power supply apparatus which converts a power supply voltage into a target voltage using a combination of series regulator and switching regulator.

2. Description of the Related Art

In battery-driven portable equipment such as a portable telephone and a personal digital assistant (PDA), measures for extending battery life are taken. For example, the equipment may be placed in a sleep state or a standby state while a user is not using the equipment. In the equipment of this type, efficient voltage conversion is enabled by switchably putting into use a series regulator such as a low drop out (LDO) regulator and a switching regulator such as a DC/DC converter. In a low-load state such as a standby state, power consumption is controlled by putting a LDO regulator of a low power consumption type into use. When the load is increased while the equipment is being used, efficiency is improved by putting into use a DC/DC converter.

However, when a LDO regulator and a DC/DC converter are turned on and off in a mutually exclusive manner, the output voltage varies during a switching operation, preventing a stable supply of the voltage. Measures should be taken to control a voltage variation during a switching operation to a minimum level.

Japanese Laid-Open Patent Application 2003-9515 discloses a power supply system provided with a series regulator and a switching regulator for controlling a power supply output voltage at a constant level, and switchably putting into use the series regulator and the switching regulator in accordance with the magnitude of load current. There is provided a period of time in which both the series regulator and the switching regulator are operated while switching takes place.

By providing a period of time in which a series regulator and a switching regulator are concurrently operated while switching from a series regulator to a switching regulator takes place, an undershoot or an overshoot, in which the output voltage temporarily diverges from a target voltage at start-up of the switching regulator, occurs. This is because the series regulator and the switching regulator share a feedback point in a feedback system. When a transient variation in the output voltage occurs while switching takes place, it is impossible to output a stable converted voltage in a time span that includes the switching operation.

Related Art List
    JPA laid open 2003-9515

SUMMARY OF THE INVENTION

The present invention is achieved in view of these circumstances and its object is to provide a power supply apparatus capable of stabilizing an output voltage while switching between a series regulator and a switching regulator takes place.

One mode of practicing the present invention is a power supply apparatus. The apparatus comprises: a series regulator converting a power supply voltage into a predetermined voltage and outputting the converted voltage to a shared output terminal; a switching regulator converting the power supply voltage into the predetermined voltage and outputting the converted voltage to the shared output terminal; a common feedback unit feeding a detected voltage at the shared output terminal back to the series regulator and the switching regulator; and a switching control unit switchably putting the series regulator and the switching regulator into operation depending on the magnitude of a load current.

The switching control unit provides, in switching from the series regulator to the switching regulator, a period of time in which the series regulator and the switching regulator are concurrently operated such that the capability of the switching regulator is lowered than normal in the period of time for concurrent operation. The switching control unit may return the switching regulator to a normal capability when the period of time for concurrent operation expires. With this construction, it is possible to suppress a variation in output caused by an undershoot or an overshoot occurring when switching from a series regulator to a switching regulator takes place.

Optional combinations of the aforementioned constituting elements, and implementations of the invention in the form of methods, apparatuses and systems may also be practiced as additional modes of the present invention.

DETAILED DESCRIPTION OF THE INVENTION

Figure 1:
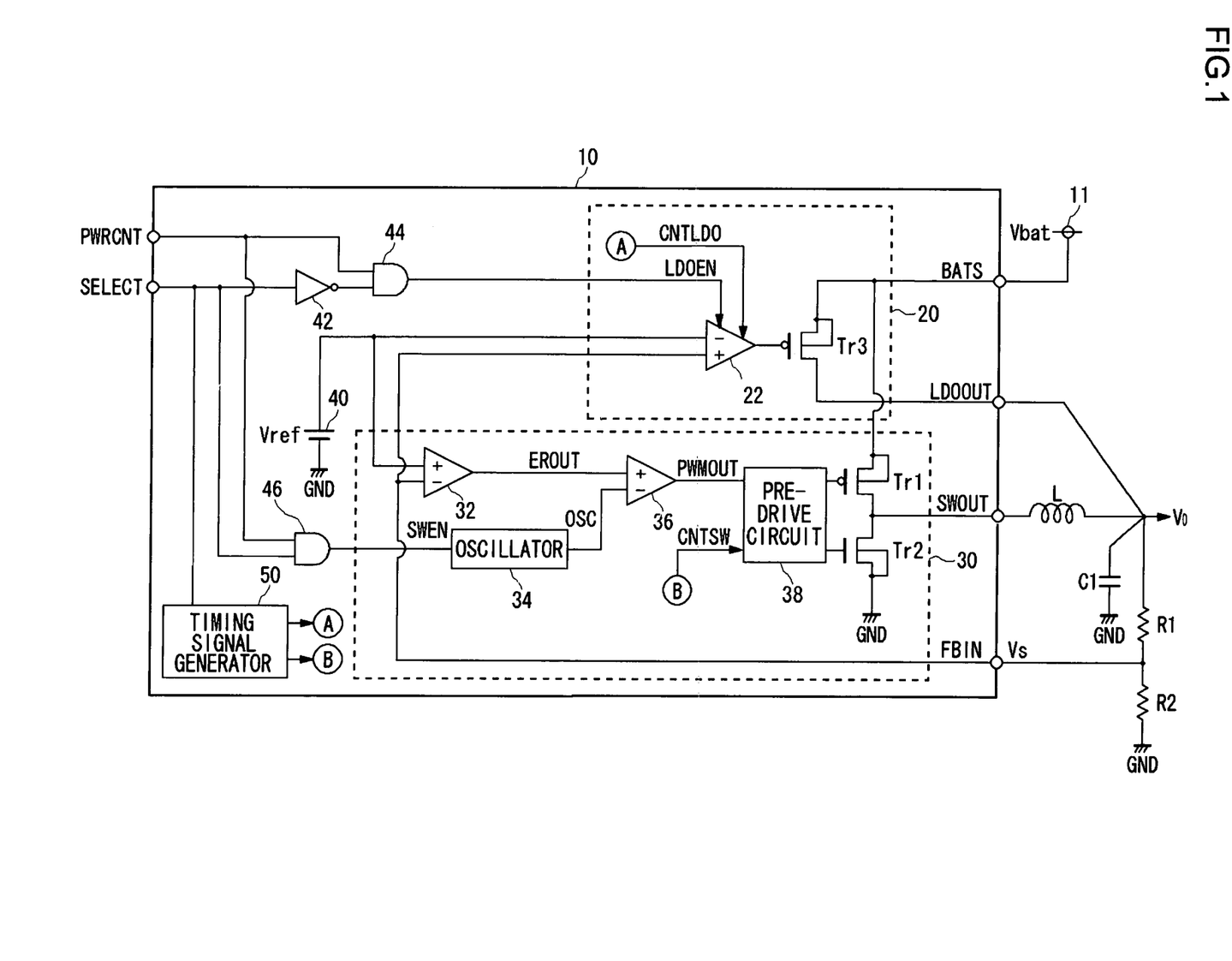
FIG. 1 shows a construction of a power supply apparatus according to the embodiment in which a LDO regulator and a DC/DC converter are connected in parallel so as to be switchably put into operation.

FIG. 1 shows a construction of a power supply apparatus 10 according to an embodiment of the present invention. The power supply apparatus 10 is provided with a LDO regulator 20, a series regulator, and a DC/DC converter 30, a switching regulator. The LDO regulator 20 and the DC/DC converter 30 are connected in parallel and share an output terminal. The LDO regulator 20 and the DC/DC converter 30 are switchably operated depending on the load. The LDO regulator 20 and the DC/DC converter 30 both control a voltage Vbat of a power supply 11 such as a lithium ion battery at a constant output voltage VO.

By dividing the output voltage VO at the output terminal shared by the LDO regulator 20 and the DC/DC converter 30 by two voltage-division resistors R1 and R2, a detected voltage Vs is obtained. The detected voltage Vs is input to a feedback input terminal FBIN and fed back to the LDO regulator 20 and the DC/DC converter 30. The LDO regulator 20 and the DC/DC converter 30 receive a common reference voltage Vref from a reference voltage source 40, and stabilizes the output voltage VO according to feedback control based on an error between the reference voltage Vref and the detected voltage Vs. Thus, the LDO regulator 20 and the DC/DC converter 30 are operated by sharing a feedback point.

The output voltage VO and the detected voltage Vs are in a relationship such that VO=Vs×(1+R1/R2). When the output voltage VO is to be controlled at a target level of 2.2V, the detected voltage Vs is 0.8V, given that the two voltage-division resistors R1 and R2 are 1400 kΩ and 800 kΩ, respectively.

The first error amplifier 22 receives the detected voltage Vs at a positive terminal and the reference voltage Vref at a negative terminal. The first error amplifier 22 compares the detected voltage Vs with the reference voltage Vref, turns the PMOS gate Tr3 off when the detected voltage Vs is higher, and turns the PMOS gate Tr3 on when the reference voltage Vref is higher.

The PMOS gate Tr3 of the LDO regulator 20 is turned on and off depending on the output of the first error amplifier 22 so as to lower the battery voltage Vbat from the power supply 11, and outputs the lowered voltage to the output terminal LDOOUT of the LDO regulator. The voltage lowered by the LDO regulator 20 is stabilized by a smoothing capacitor C1 and is output as the output voltage VO. The output voltage VO of the LDO regulator 20 is maintained at the target level of 2.2 V by the feedback control.

An LDO regulator enable signal (hereinafter, referred to as LDOEN signal) input to the first error amplifier 22 is for on-off control of the LDO regulator 20. The LDO regulator on-off switching timing signal (hereinafter, referred to as a CNTLDO signal) input to the first error amplifier 22 from a timing signal generator 50 is for control of the timing for on-off switching of the LDO regulator 20.

The DC/DC converter 30 includes a second error amplifier 32, an oscillator 34, a pulse width modulation (PWM) comparator 36, a pre-drive circuit 38, a PMOS gate Tr1 and an NMOS gate Tr2. The PMOS gate Tr1 and the NMOS gate Tr2 are connected in series to the power supply 11. The source of the PMOS gate Tr1 is connected to the power supply input terminal BATS. The drain of the PMOS gate Tr1 is connected to the source of the NMOS gate Tr2. The drain of the NMOS gate Tr2 is grounded. The drain of the PMOS gate Tr1 is connected to an output terminal SWOUT of the switching regulator. An output of the pre-drive circuit 38 is applied to the gate of the PMOS gate Tr1 and that of the NMOS gate Tr2.

The second error amplifier 32 receives the reference voltage Vref at a positive terminal and receives the detected voltage Vs at a negative terminal. The second error amplifier 32 compares the detected voltage Vs with the reference voltage Vref, and outputs an error output signal (hereinafter, referred to as an EROUT signal) to the PWM comparator 36. The PWM comparator 36 compares a triangular pulse signal (hereinafter, referred to as an OSC signal) with the EROUT signal output from the second error amplifier 32, and outputs a pulse width modulated signal (hereinafter, referred to as a PWMOUT signal) to the pre-drive circuit 38 in accordance with a result of comparison. The pre-drive circuit 38 uses the PWMOUT signal from the PWM comparator 36 for on-off control of the PMOS gate Tr1 and the NMOS gate Tr2.

The duty ratio of the PWMOUT signal output by the PWM comparator 36 controls the on duty period of the PMOS gate Tr1 and the NMOS gate Tr2. The lowered voltage is output from the output terminal SWOUT of the switching regulator. The voltage lowered by the DC/DC converter 30 is stabilized by the capacitor L and the smoothing capacitor C1, and is output as the output voltage VO. The output voltage VO of the DC/DC converter 30 is maintained at the target level of 2.2 V by the feedback control.

A switching regulator enable signal (hereinafter, referred to as a SWEN signal) input to the oscillator 34 is for on-off control of the DC/DC converter 30. A switching regulator capability switching timing signal (hereinafter, referred to as a CNTSW signal) input from the timing signal generator 50 to the pre-drive circuit 38 is for control of timing for switching the capability of the DC/DC converter 30.

A description will now be given of an operation for switching between the LDO regulator 20 and the DC/DC converter 30 in the power supply apparatus 10. Described first will be an operation performed when an input signal (hereinafter, referred to as a PWRCNT signal) at a power supply control terminal PWRCNT is at a high level and an input signal (hereinafter, referred to as a SELECT signal) at a regulator switching terminal SELECT is at a low level. The PWRCNT signal at a high level is input to a first AND gate 44. The SELECT signal at a low level is inverted by an inverter 42 to be turned into a high-level signal and input to the first AND gate 44. The first AND gate 44 outputs the LDOEN signal at a high level so as to configure the first error amplifier 22 of the LDO regulator 20 to be active. With this, the LDO regulator 20 is turned on.

A second AND gate 46 receives the PWRCNT signal at a high level and the SELECT signal at a low level so as to output the SWEN signal at a low level so as to configure the oscillator 34 to be non-active. With this, the DC/DC converter 30 is turned off.

A description will now be given of an operation performed when the PWRCNT signal is at a high level and the SELECT signal is at a high level. The PWRCNT signal at a high level is input to the first AND gate 44. The SELECT signal at a high level is inverted by the inverter 42 to be turned into a low-level signal and input to the first AND gate 44. The first AND gate 44 outputs the LEOEN signal at a low level so as to configure the first error amplifier 22 of the LDO regulator 20 to be non-active. With this, the LDO regulator 20 is turned off.

When the PWRCNT signal is at a low level, the first AND gate 44 outputs the LDOEN signal at a low level regardless of the level of the SELECT signal. The second AND gate 46 outputs the SWEN signal at a low level so that both the LDO regulator 20 and the DC/DC converter 30 are turned off.

As described above, when the SELECT signal is at a low level, the LDO regulator 20 is turned on and the DC/DC converter 30 is turned off. When the SELECT signal is at a high level, the DC/DC converter 30 is turned on and the LDO regulator 20 is turned off. Thus, by switching the level of the SELECT signal, the LDO regulator 20 and the DC/DC converter 30 are turned on and off basically in a mutually exclusive manner. If the LDO regulator 20 and the DC/DC converter 30 are turned on and off in a completely mutually exclusive manner, there will be created a moment when both the LDO regulator 20 and the DC/DC converter 30 are concurrently turned off while switching takes place, thus causing the output voltage VO to be unstable. Accordingly, there is provided a period of time in which both the LDO regulator 20 and the DC/DC converter 30 are concurrently turned on while switching takes placed.

However, even if a period of time in which both the LDO regulator 20 and the DC/DC converter 30 are concurrently turned on is provided while switching takes place, an undershoot or an overshoot is generated as a result of the output of the LDO regulator 20 affecting the feedback system of the DC/DC converter 30 while switching from the LDO regulator 20 to the DC/DC converter 30 takes place. This is because the LDO regulator 20 and the DC/DC converter 30 share a feedback point.

Figure 2A:
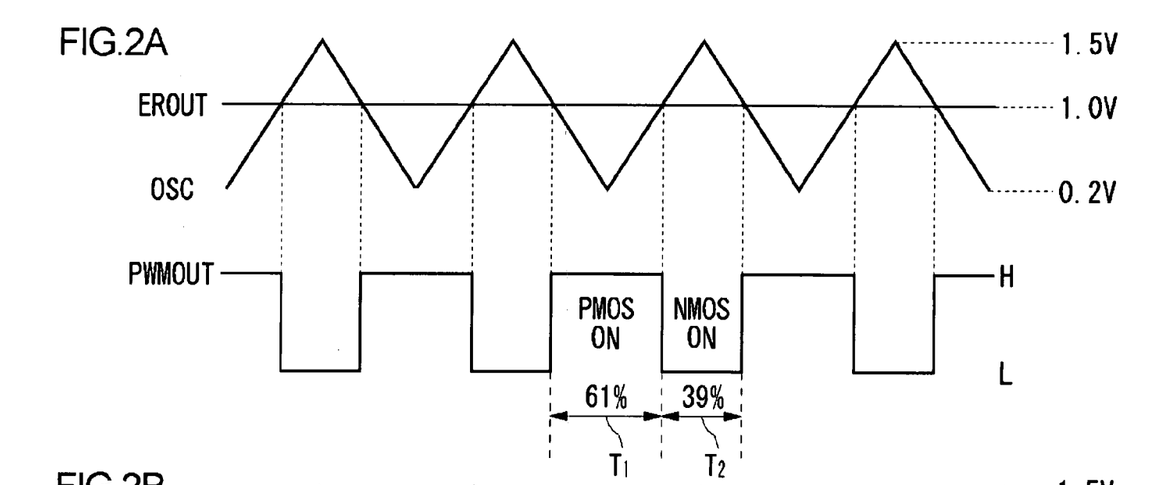
FIG. 2A shows a duty ratio of pulse signal output by a PWM comparator when the DC/DC converter is operated normally.

A description will now be given of a cause of an undershoot by referring to FIGS. 2A and 2B. FIG. 2A shows a relationship between the EROUT signal, the OSC signal and the PWMOUT signal in a normal operation of the DC/DC converter 30. When the DC/DC converter 30 outputs the output voltage VO of the target voltage of 2.2 V in a stable manner given that Vbat=3.6[V], the on period of the PMOS gate Tr1 is 61% of the total period, the on period of the NMOS gate Tr2 is 39%, and the duty ratio of the PWMOUT signal is approximately 60%. The lower limit voltage of the OSC signal is 0.2 V, the upper limit voltage is 1.5 V, and the voltage of the EROUT signal is approximately 1.0 V.

Figure 2B:
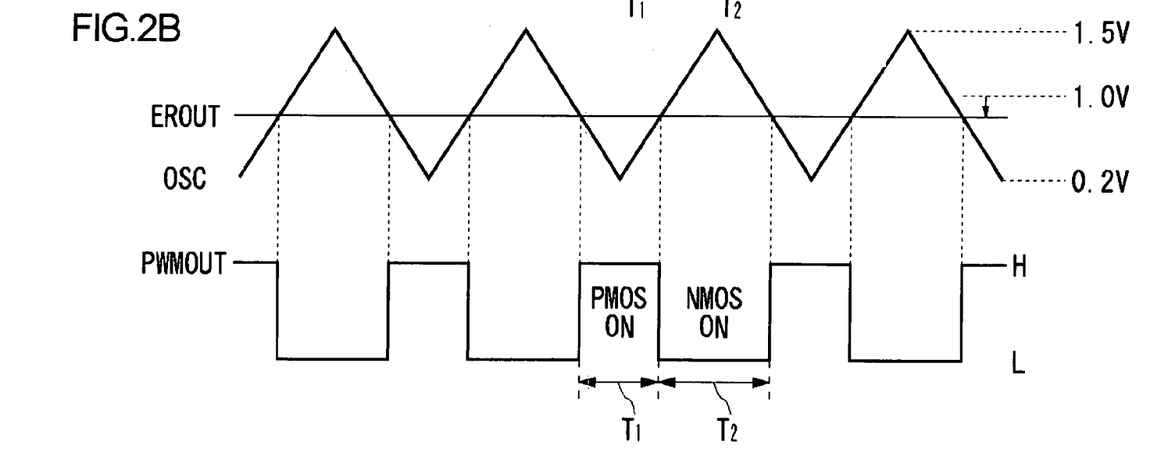
FIG. 2B shows a duty ratio of pulse signal output by the PWM comparator when the LDO regulator and the DC/DC converter are concurrently operated.

FIG. 2B shows a relationship between the EROUT signal, the OSC signal and the PWMOUT signal when the LDO regulator 20 and the DC/DC converter 30 are operated concurrently. The DC/DC converter 30 starts its operation with an initial duty ratio of 50% when switching from the LDO regulator 20 to the DC/DC converter 30 takes place. Since the LDO regulator 20 is not turned off yet, the LDO regulator 20 outputs the output voltage VO at the target level of 2.2 V. Since the output terminal is shared, the detected voltage Vs remains at a high level due to the output of the LDO regulator 20, and is input to the feedback input terminal FBIN and fed back to the DC/DC converter 30. As a result, the EROUT signal is lower than the normal voltage of 1.0 V shown in FIG. 2A. As shown in FIG. 2B, the on period T1 of the PMOS gate Tr1 is shorter than in the normal operation and the on period T2 of the NMOS gate Tr2 is extended. Therefore, the despite the fact that the output voltage VO is at the target level of 2.2 V due to the output from the LDO regulator 20, the feedback system of the DC/DC converter 30 operates to lower the output voltage VO, thus causing an undershoot.

A description will be given, by referring to FIGS. 3A and 3B, of how an undershoot occurs while switching from the LDO regulator 20 to the DC/DC converter 30 takes place and a method of controlling the undershoot. It is assumed here that the battery voltage Vbat is approximately 3.6 V. The target voltage 2.2 V of the output voltage VO is higher than ½ of the battery voltage Vbat.

Figure 3A:
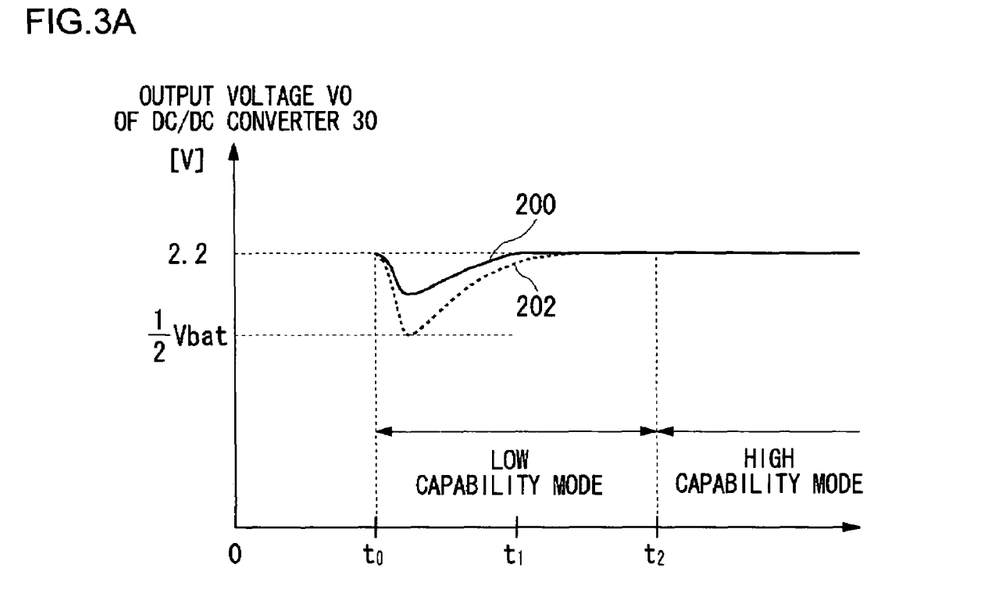
FIG. 3A shows a variation of output voltage of the DC/DC converter when the LDO regulator and the DC/DC converter are concurrently operated.

FIG. 3A shows how the output voltage VO of the DC/DC converter 30 varies. FIG. 3B shows how the output voltage VO of the LDO regulator 20 varies. By providing a period of time in which the LDO regulator 20 and the DC/DC converter 30 are concurrently operated, the LDO regulator 20 remains turned on when the DC/DC converter 30 is switched from an off state to an on state at time t0. The LDO regulator 20 is turned off at t1 later than time t0 when the DC/DC converter 30 is turned on.

Figure 3B:
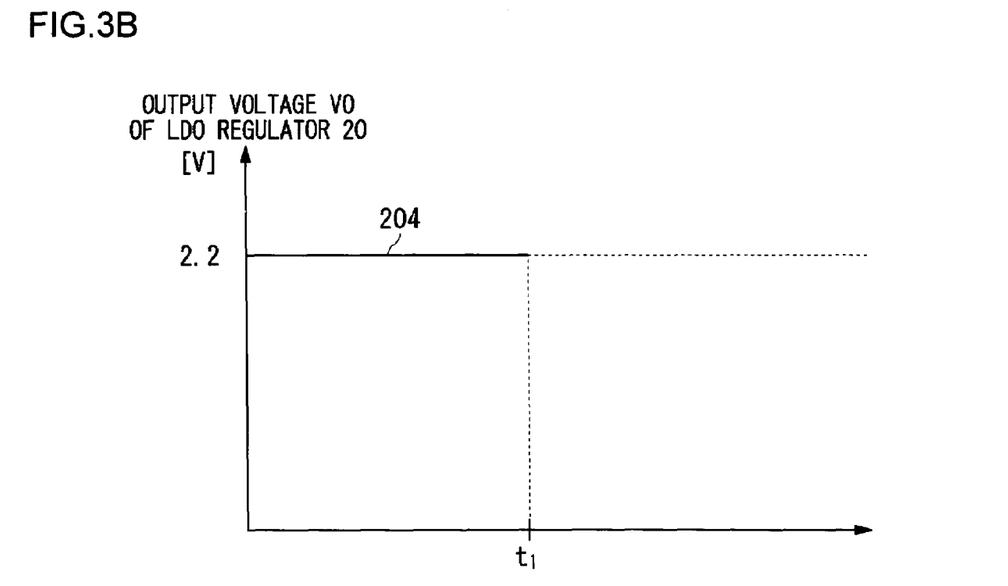
FIG. 3B shows a variation of output voltage of the LDO regulator when the LDO regulator and the DC/DC converter are concurrently operated.

As shown in a graph 204 of FIG. 3B, the output voltage VO of the LDO regulator 20 is at the target level of 2.2 V until time t1 when the LDO regulator 20 is turned off, and at 0 V after time t1. Since the DC/DC converter 30 is turned on at time t0 while the LDO regulator 20 remains turned on, as shown in FIG. 3A, an initial value of the output voltage VO of the DC/DC converter 30 is 2.2 V.

At time t0, the DC/DC converter 30 is started with an initial duty ratio of 50%. Since the initial value of the output voltage VO is 2.2 V, higher than ½Vbat, the DC/DC converter 30 controls the output voltage VO to approach ½Vbat, lower than 2.2 V. Assuming that the LDO regulator 20 is turned off, the output voltage VO is lowered for a time to ½Vbat, as indicated by a dotted-line graph 202 of FIG. 3A. Subsequently, the output voltage VO is increased due to an increase in the duty ratio and controlled at the target voltage of 2.2 V. In an actual situation, the LDO regulator 20 is turned on so that the output of the LDO regulator 20 operates to boost the output of the DC/DC converter 30. As indicated by a solid-line graph 200 of FIG. 3A, the output voltage VO is lowered toward ½Vbat but is prevented from reaching ½Vbat. The output voltage VO is increased again and controlled at the target level of 2.2 V.

When the LDO regulator 20 and the DC/DC converter 30 are operated concurrently, the output voltage VO is already at the target level of 2.2 V when the DC/DC converter 30 is started. Therefore, despite the fact that the DC/DC converter 30 is adapted for a duty ratio of 50% internally, the on duty period of the NMOS gate Tr2 is extended by the feedback control so that the DC/DC converter 30 operates to lower the output voltage VO temporarily. As a result, an undershoot, in which the output voltage VO is pulled down from the target level when the DC/DC converter 30 is started, occurs. Described above is the cause of an undershoot when the target level of 2.2 V of the output voltage VO is higher than ½ of the battery voltage Vbat. When, conversely, the target level of 2.2 V of the output voltage VO is lower than ½ of the battery voltage Vbat, an overshoot, in which the output voltage VO is increased toward ½Vbat before being converged to 2.2 V, occurs.

An undershoot or an overshoot is generated by the feedback control operating in a direction not desired because the DC/DC converter 30 is operated to its full capability while the LDO regulator 20 remains turned on. In order to suppress an undershoot or an overshoot, the power supply apparatus 10 according to the embodiment is configured such that the capability of the DC/DC converter 30 is controlled to be low when the DC/DC converter 30 is started. As shown in FIG. 3A, the power supply apparatus 10 starts the DC/DC converter 30 at time t0 in a low-capability mode. Voltage conversion is performed while the capability is limited until time t2. The LDO regulator 20 is turned off at time t1. Subsequently, the capability of the DC/DC converter 30 is returned to normal at time t2 so that the DC/DC converter 30 is operated in a high capability mode.

For control of timing for switching the capability of the DC/DC converter 30, the timing signal generator 50 receiving the SELECT signal at a high level supplies the CNTLDO signal to the LDO regulator 20 so as to designate the timing for switching from the on state to the off state of the LDO regulator 20, and supplies the CNTSW signal to the DC/DC converter 30 so as to designate switching from a low capability to a high capability of the DC/DC converter 30.

A description will now be given of the timing control for switching the capability of the DC/DC converter 30 effected by the timing signal generator 50, by referring to FIGS. 4A and 4B. For comparison, timing control when an undershoot occurs will be explained by referring to FIG. 4A, and timing control for suppressing an undershoot will be explained by referring to FIG. 4B.

Figure 4A:
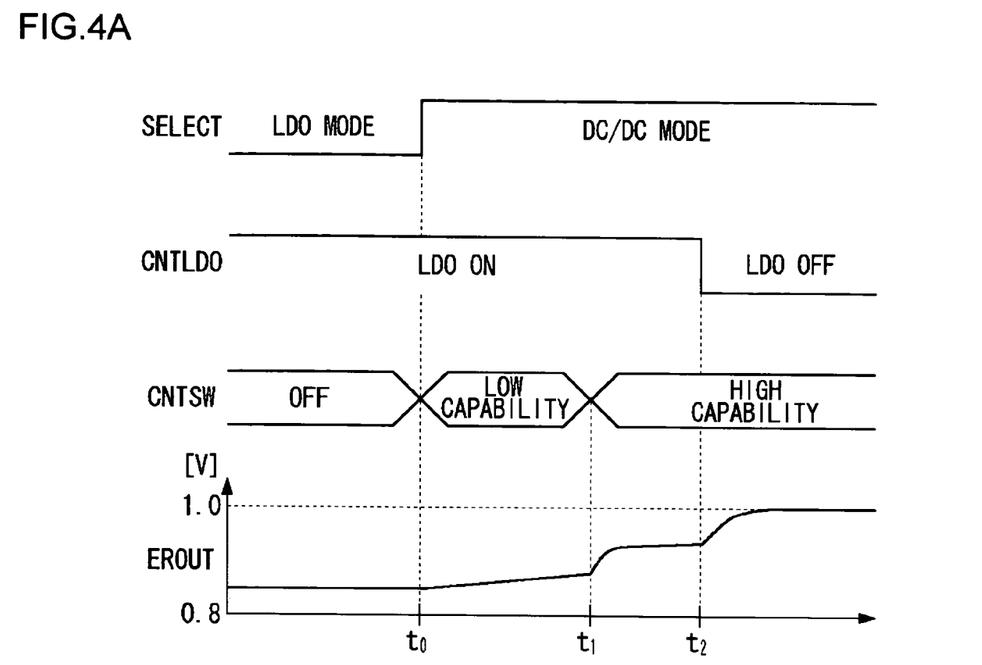
FIG. 4A shows timing control for switching the capability of the DC/DC converter when an undershoot occurs.

FIG. 4A shows a relationship between the SELECT signal, the CNTLDO signal, the CNTSW signal and the EROUT signal when an undershoot occurs. At time t0, the SELECT signal goes from low to high. The DC/DC converter 30 is turned on and started in a low capability mode. The LDO regulator 20 remains turned on while the CNTLDO signal remains at a high level. When the CNTLDO signal goes low at time t2, the LDO regulator 20 is turned off. The DC/DC converter 30 remains in a low capability mode while the CNTSW signal remains low. When the CNTSW signal goes high at time t1, which precedes the turning off of the LDO regulator 20, the DC/DC converter 30 is switched from a low capability to a high capability.

Referring to FIG. 4A, the capability of the DC/DC converter 30 is elevated at t1 while the LDO regulator 20 remains turned on, causing the output voltage VO to drop and generating an undershoot. The level of the EROUT signal is abruptly increased. The output voltage VO is lowered and an undershoot is generated also at time t2 when the LDO regulator 20 is turned off. The level of the EROUT signal is abruptly increased. Therefore, in order to suppress an undershoot, it is necessary to elevate the capacity of the DC/DC converter 30 close to a point of time when the EROUT signal reaches a normal operating point of 1.0 V.

Figure 4B:
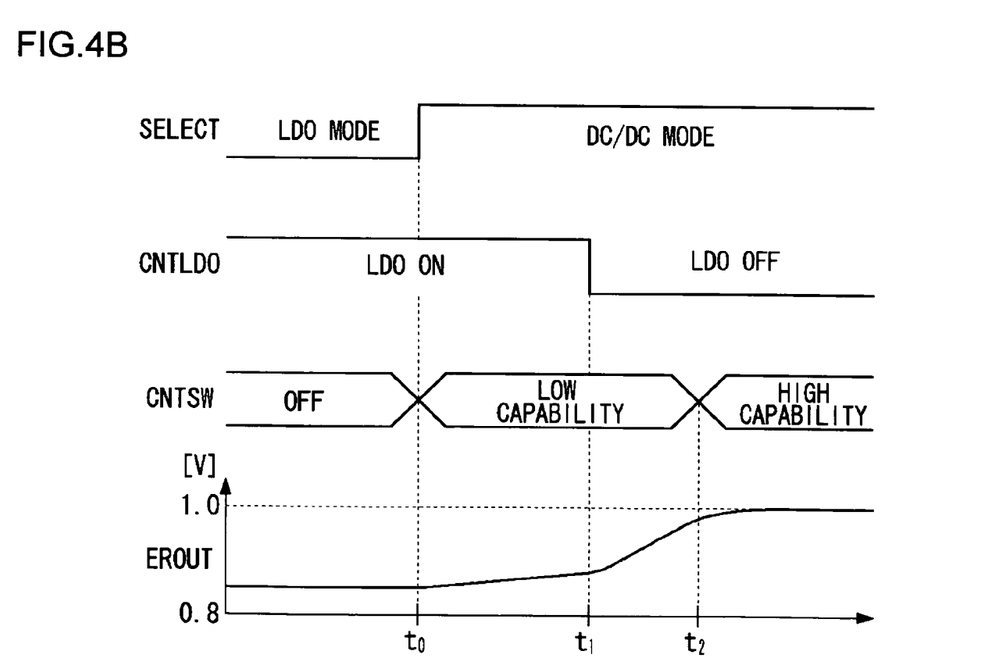
FIG. 4B shows timing control for switching the capability of the DC/DC converter when an undershoot is suppressed.

FIG. 4B shows a relationship between the SELECT signal, the CNTLDO signal, the CNTSW signal and the EROUT signal when an undershoot is suppressed by changing the timing for switching the capability of the DC/DC converter 30. At time t0, the SELECT signal goes from low to high, the DC/DC converter 30 is turned on and started in a low capability mode. The timing signal generator 50 shifts the CNTLDO signal to a low level at time t1 subsequent to the generation of the SELECT signal at a high level. With this, the LDO regulator 20 is turned off. The timing signal generator 50 shifts the CNTSW signal to a high level at time t2 subsequent to the turning-off of the LDO regulator 20. With this, the DC/DC converter 30 is switched from a low-capability mode to a high-capability mode.

In a period of time between time t0 and time t1, the LDO regulator 20 and the DC/DC converter 30 are operated concurrently. Since the capability of the DC/DC converter 30 is limited, however, an undershoot is suppressed. At time t1, the LDO regulator 20 is turned off and the output voltage VO is lowered accordingly. Since the DC/DC converter 30 is operated in a low-capability mode, the EROUT signal is gradually raised subsequent to time t1 by the feedback control. The on period of the PMOS gate Tr1 is extended so that the output voltage VO is raised. At time t2, the capability of the DC/DC converter 30 is elevated. Since the switching to the high capability occurs at a point of time close to the normal feedback point of the output voltage VO with the target level of 2.2 V, an undershoot is suppressed.

By effecting timing control in which the timing signal generator 50 turns the LDO regulator 20 off and then switches the DC/DC converter 30 from a low capability to a high capability, the variation in the EROUT signal moderated so that an undershoot is suppressed. Described above is timing control for suppressing an undershoot. Timing control for suppressing an overshoot is effected similarly.

The timing signal generator 50 is provided with an internal oscillator and a shift register. When the SELECT signal at a high level is input, the shift register is operated so as to count the number of clocks occurring since the SELECT signal goes high. The timing signal generator 50 generates the CNTLDO signal at a high level with a delay of n1 clocks, and generates the CNTSW at a high level signal with a delay of n2 clocks, where natural numbers, n1 and n2, are in a relationship such that n1<n2.

Alternatively, the timing signal generator 50 may be provided with a CR time constant circuit using a capacitor C and a resistor R. Responsive to the input of the SELECT signal at a high level, the timing signal generator 50 may generate the CNTLDO signal and the CNTSW signal by generating a delay commensurate with the time constant CR.

Alternatively, the timing signal generator 50 may be provided with a circuit receiving the output voltage VO, occurring in a switching operation, and detecting that the variation, due to an undershoot, in the output voltage VO is converged to a predetermined range. The timing signal generator 50 may generate the CNTSW signal at a high level when the output voltage VO is converted to a predetermined voltage range since the input of the SELECT signal at a high level.

Figure 5:
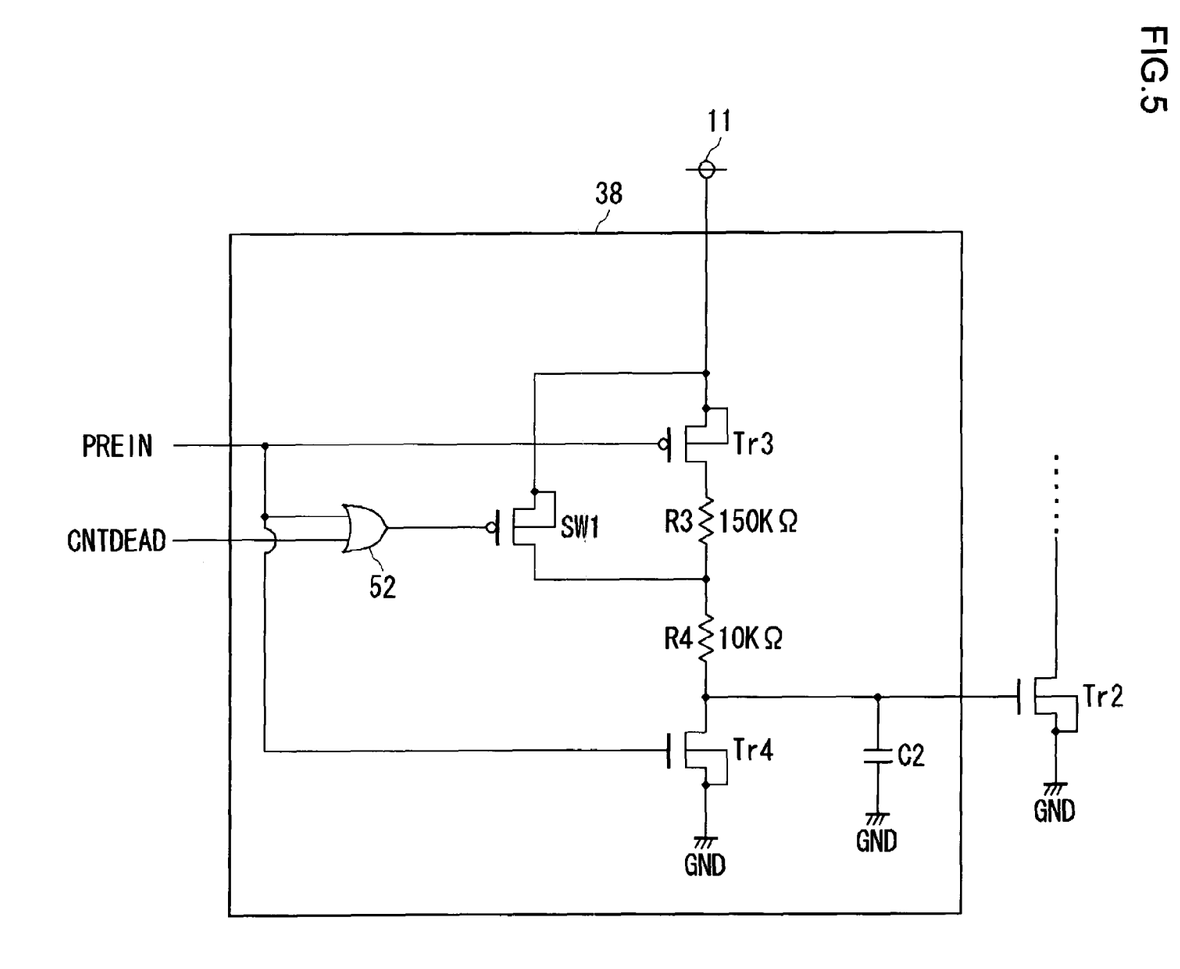
FIG. 5 shows a construction of a pre-drive circuit for switching the capability of the DC/DC converter.

A description will now be given of the construction and operation for switching the capability of the DC/DC converter 30. FIG. 5 shows a construction of the pre-drive circuit 38 for switching the capability of the DC/DC converter 30. A capability switching circuit built in the pre-drive circuit 38 controls the on period of the NMOS gate Tr2, and provides dead time so that the NMOS gate Tr2 is not turned on immediately when the PMOS gate Tr1 is turned off. As shown in FIG. 1, the pre-drive circuit 38 is supplied with the PWMOUT signal from the PWM comparator 36 and with the CNTSW signal from the timing signal generator 50. For ease of understanding, these signals will be referred to as a pre-drive input signal (hereinafter, referred to as a PREIN signal) and a dead time control signal (hereinafter, referred to as a CNTDEAD signal). The NMOS gate Tr2 subject to dead time control will be referred to as a power transistor Tr2.

The pre-drive circuit 38 includes a PMOS gate Tr3, an NMOS gate Tr4, a dead time switching gate SW1, and an OR gate 52. Pull-up resistors R3 and R4 are connected between the drain of the PMOS gate Tr3 and the source of the NMOS gate Tr4. The pull-up resistors R3 and R4 constitute a time constant circuit with a capacitor C2.

A description will now be given of an operation performed when the PREIN signal is at a low level and the CNTDEAD signal is at a high level. The OR gate 52 receiving the PREIN signal at a low level and the CNTDEAD signal at a high level outputs a high-level signal so as to turn the dead time switching gate SW1 off. The PREIN signal at a low level is applied to the gate of the PMOS gate Tr3 and the NMOS gate Tr4 so that the PMOS gate Tr3 is turned on and the NMOS gate Tr4 is turned off. With this, the PMOS gate Tr3, the pull-up resistor R3 of 150 kΩ, the pull-up resistor R4 of 10 kΩ and the capacitor C2 constitute a time constant circuit so that the power transistor Tr2 is turned on by the voltage from the power supply 11 with a delay. Accordingly, there is created dead time before the power transistor Tr2 is turned on. A dead time control mode as described above is referred to as "long".

A description will now be given of an operation when both the PREIN signal and the CNTDEAD signal are at a low level. The OR gate 52 receiving the PREIN signal at a low level and the CNTDEAD signal at a low level outputs a low-level signal so as to turn the dead time switching gate SW1 on. The PREIN signal at a low level turns the PMOS gate Tr3 on and turns the NMOS gate Tr4 off. With this, the dead time switching gate SW1, the pull-up resistor R4 of 10 kΩ and the capacitor C2 constitute a time constant circuit so that the power transistor Tr2 is immediately turned on by the voltage from the power supply 11. Accordingly, dead time before the power transistor Tr2 is turned on is relatively short. A dead time control mode as described above is referred to as "short".

A description will now be given of an operation performed when the PREIN signal is at a high level. In this case, the OR gate 52 outputs a high-level signal regardless of the level of the CNTDEAD signal, so as to turn the dead time switching gate SW1 off. The PREIN signal at a high level turns the PMOS gate Tr3 off and turns the NMOS gate Tr4 on. Since the dead time switching gate SW1 and the PMOS gate Tr3 are both turned off, the power from the power supply 11 fails to be supplied to the power transistor Tr2 so that the power transistor Tr2 is turned off. Since the NMOS gate Tr4 is turned on, charges built up in the capacitor C2 are exhausted via the pull-up resistor R4.

Figure 6:
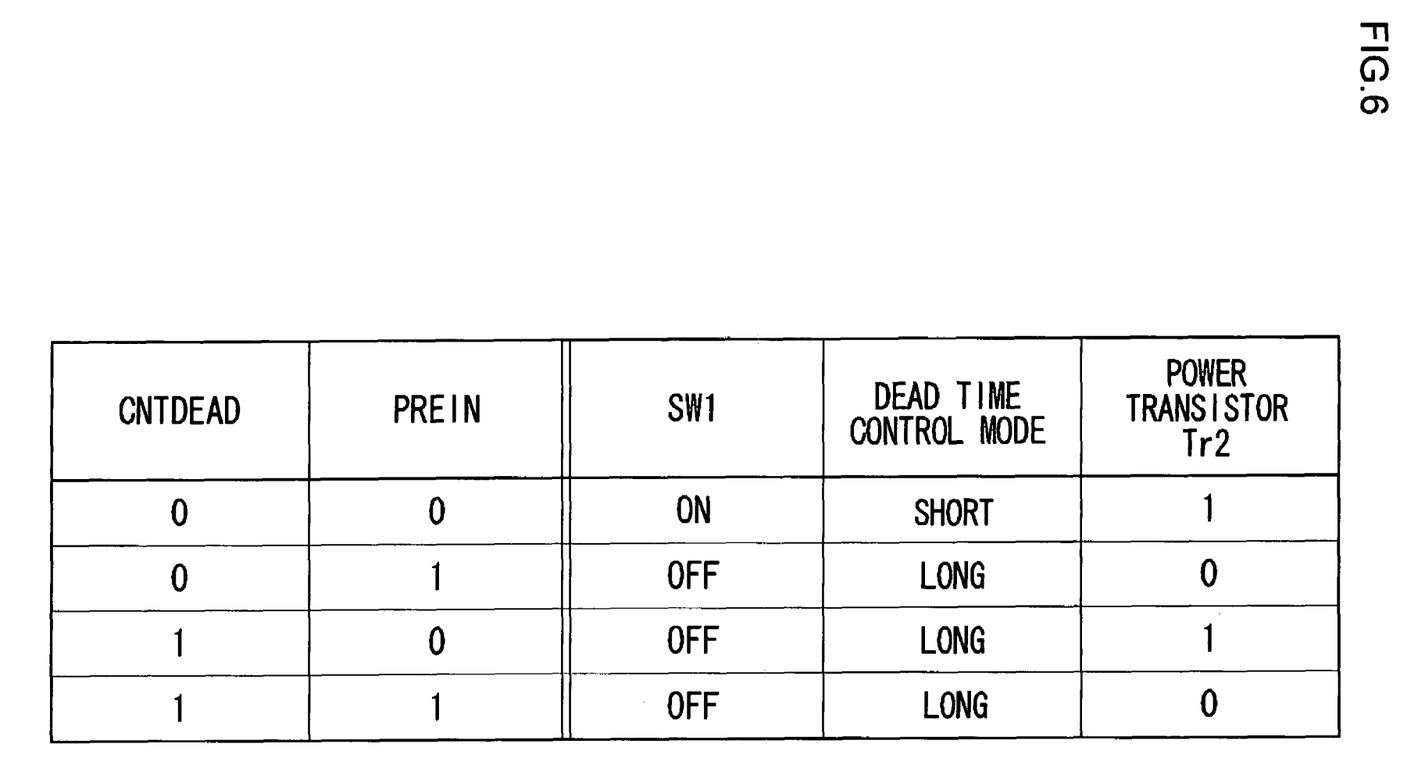
FIG. 6 shows a truth table listing inputs and outputs of signals occurring in dead time control of a power transistor.

FIG. 6 is a truth table listing inputs and outputs of signals occurring in dead time control of the power transistor Tr2, showing on-off states of the dead time switching gate SW1, the dead time control mode, and the on-off states of the power transistor Tr2 occurring responsive to the inputs of the CNTDEAD signal and the PREIN signal.

Figure 7:
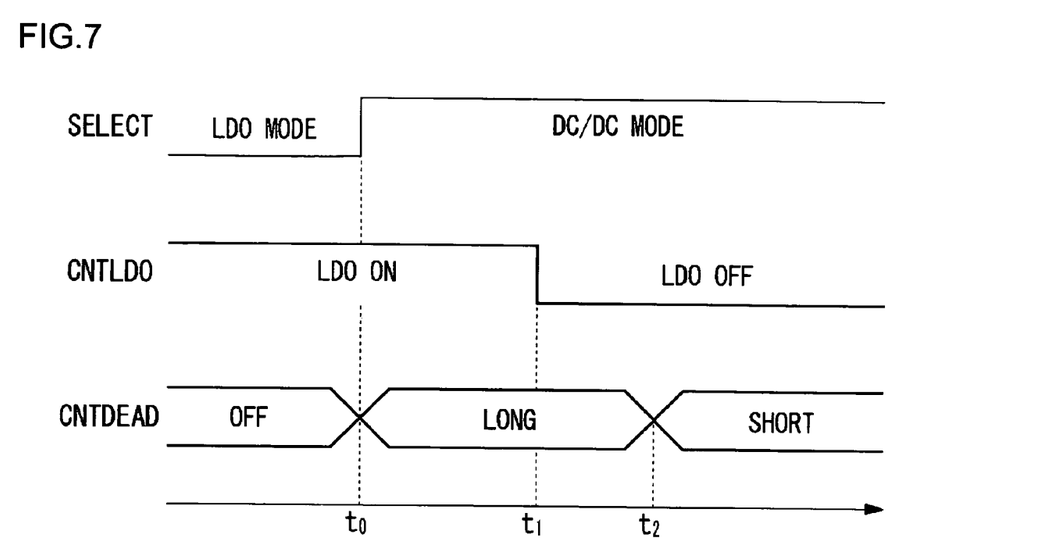
FIG. 7 shows timing for switching between dead time control modes.
Figure 8A:
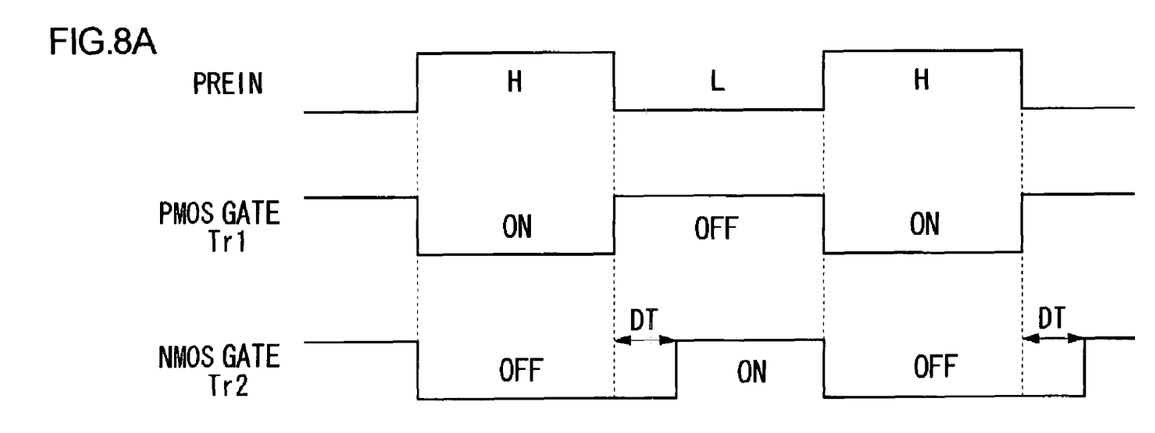
FIG. 8A is a time chart showing on and off states of the power transistor subject to dead time control.

FIG. 7 shows timing for switching between dead time control modes by the timing signal generator 50. At time t0, the SELECT signal goes high and the DC/DC converter 30 is started. The timing signal generator 50 sets the CNTDEAD signal at a high level. With this, the dead time switching gate SW1 is turned off. While the pre-drive input signal PREIN is 0, there is created dead time during the on period of the NMOS gate Tr2. Described above is a "long" mode of dead time control. FIG. 8A is a time chart showing the on and off states of the PMOS gate Tr1 and the NMOS gate Tr2. When the PMOS gate Tr1 is turned off, the NMOS gate Tr2 is not turned on immediately. The NMOS gate Tr2 is turned on with a delay of dead time DT. Therefore, there is created a period of time in which both the PMOS gate Tr1 and the NMOS gate Tr2 are concurrently turned off. By providing a delay for the turn-on-timing of the NMOS gate Tr2 of the DC/DC converter 30, that is, providing a delay before the NMOS gate Tr2 of the DC/DC converter 30 is turned on, the capability of the NMOS gate Tr2 is limited so that the capability to suppress the output voltage VO is lowered. As a result, an undershoot is suppressed.

Referring to FIG. 7 again, after the SELECT signal goes high, the timing signal generator 50 sets the CNTLDO signal at a low level at time t1. With this, the LDO regulator 20 is turned off. After the LDO regulator 20 is turned off, the timing signal generator 50 sets the CNTDEAD signal at a low level at time t2. With this, the dead time switching gate SW1 is turned off and dead time is not created before the NMOS gate Tr2 is turned on. Described above is a "short" mode of dead time control. The DC/DC converter 30 is switched to a high capability.

Figure 8B:
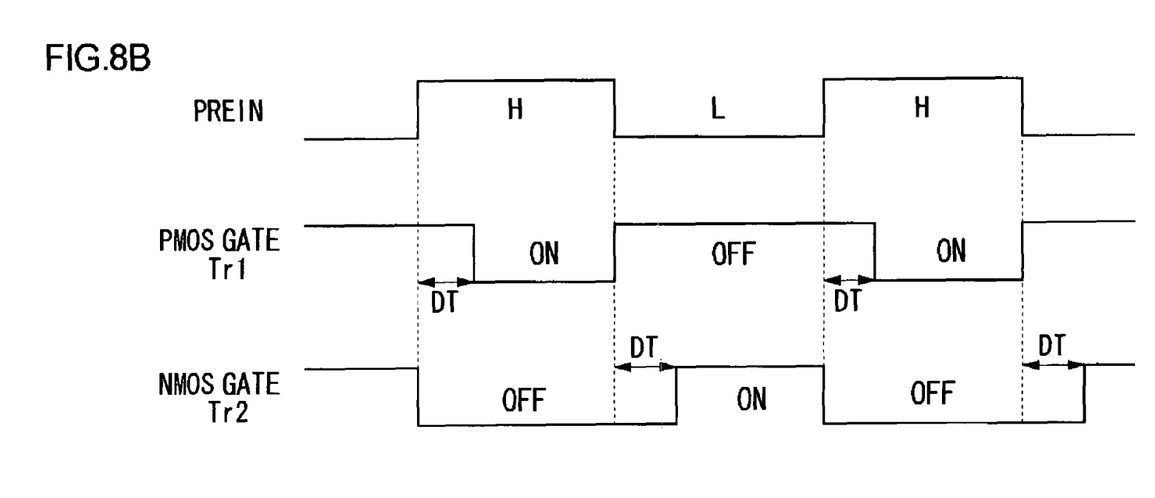
FIG. 8B is a time chart showing on and off states of the power transistor subject to dead time control.

In the above description, the capability switching circuit provided in the pre-drive circuit 38 provides dead time by providing a delay before the NMOS gate Tr2 of FIG. 1 is turned. The capability of the DC/DC converter 30 is lowered by controlling the duty ratio of the NMOS gate Tr2. Alternatively, a similar capability switching circuit may also be provided in the PMOS gate Tr1 of FIG. 1 so that the duty ratio of the PMOS gate Tr1 is controlled and the capability of the DC/DC converter 30 is lowered in an overall approach. FIG. 8B is a time chart showing an on and off states of the PMOS gate Tr1 and the NMOS gate Tr2 when the PMOS gate Tr1 is also subject to dead time control. The PMOS gate Tr1 is turned on with a delay, i.e. dead time DT is created before the PMOS gate Tr1 is turned on.

Figure 9:
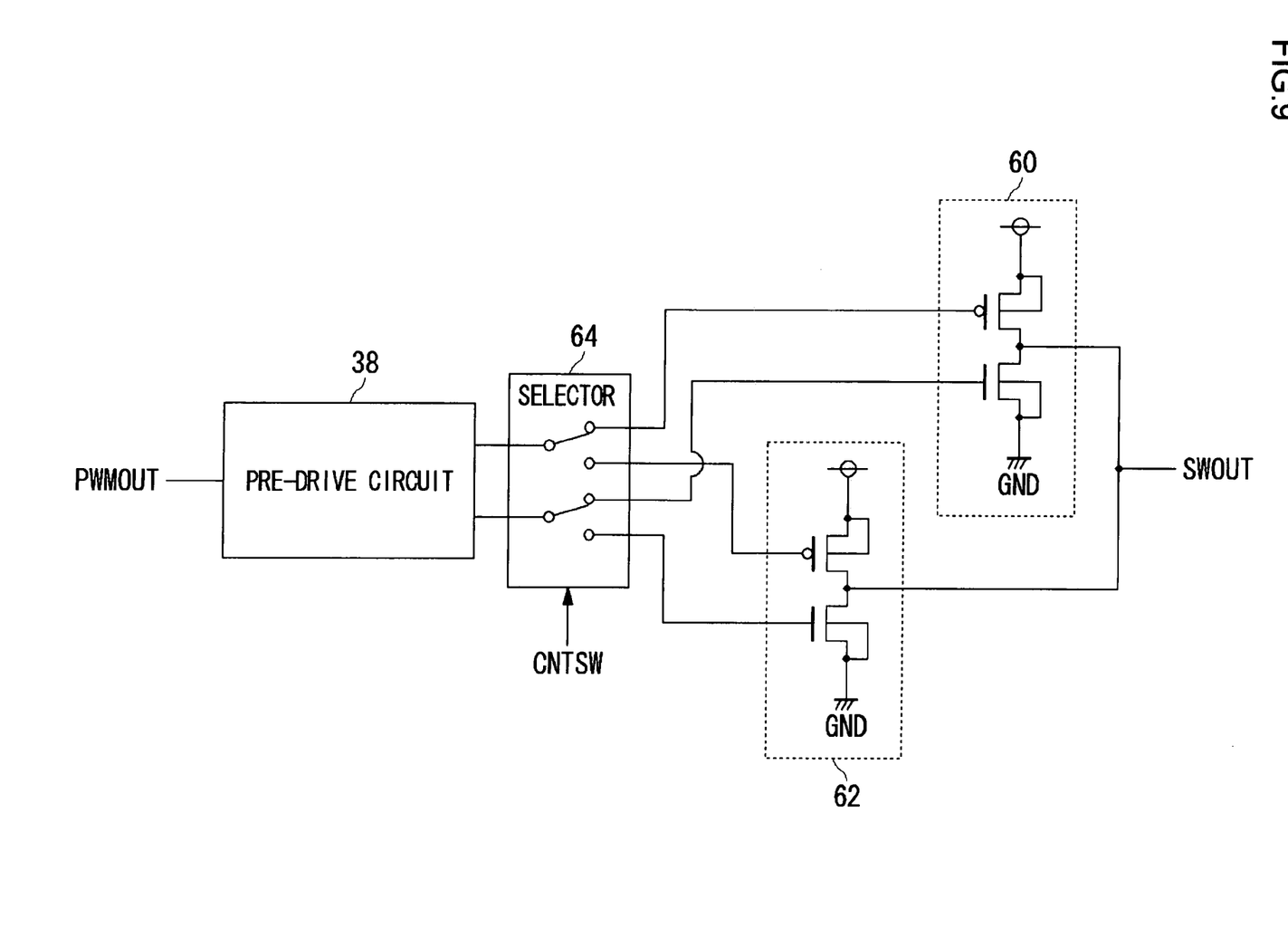
FIG. 9 shows another construction of a capability switching circuit of the DC/DC converter.

FIG. 9 shows a construction of another capability switching circuit of the DC/DC converter 30. A selector 64 is provided to succeed the pre-drive circuit 38. The CNTSW signal is used to switch between a first power transistor set 60 characterized by a large size and high performance and a second power transistor set 62 characterized by a small size and low performance. The converted voltage is output to the switching regulator output terminal SWOUT.

A gate voltage switching unit may be provided to succeed the pre-drive circuit 38 as an alternative construction of the capability switching circuit of the DC/DC converter 30. The gate voltage switching unit switches between the levels of capability of the PMOS gate Tr1 and the NMOS gate Tr2, by changing a gate voltage Vgs of the PMOS gate Tr1 and the NMOS gate Tr2 in accordance with the CNTSW signal.

A back gate voltage switching unit may be provided to succeed the pre-drive circuit 38 as an alternative configuration of the capability switching circuit of the DC/DC converter 30. The back gate switching unit switches between levels of capability of the PMOS gate Tr1 and the NMOS gate Tr2, by changing the magnitude of a back gate voltage Vbg of the PMOS gate Tr1 and the NMOS gate Tr2 in accordance with the CNTSW signal. When Vbg is negative in value, the capability is lowered. When Vbg is equal to 0, the capability is returned to normal.

Figure 10:
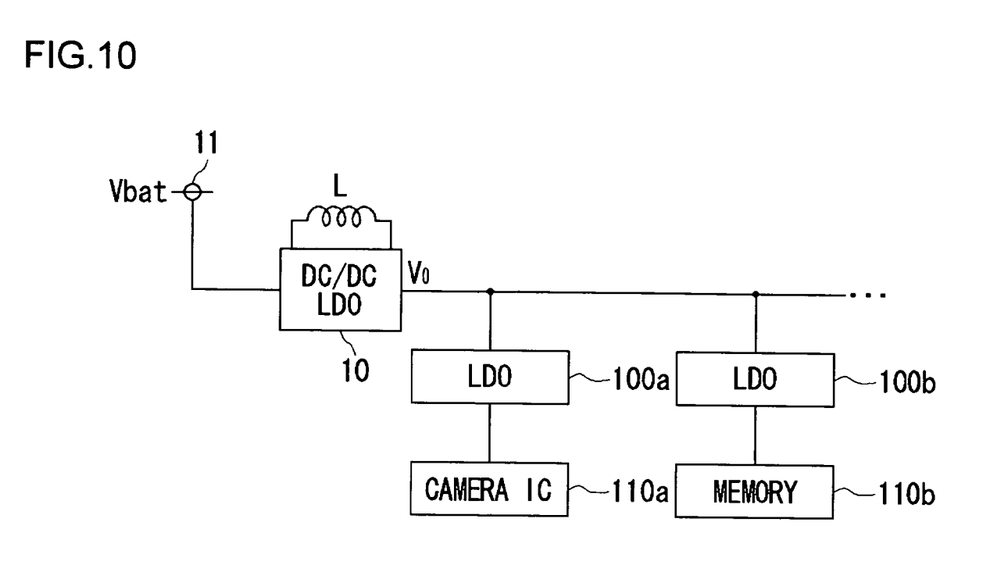
FIG. 10 shows an example of application of the power supply apparatus according to the embodiment.

FIG. 10 shows an example of application of the power supply apparatus 10 according to the embodiment. The power supply apparatus 10 controls the battery voltage Vbat from the power supply 11 at a constant level, as described above. The power supply apparatus 10 includes the LDO regulator 20 and the DC/DC converter 30 using a coil L, which are switchably put into operation depending on the load. A plurality of loads including a camera IC 110a and a memory 110b, for example, are connected to an output terminal of the power supply apparatus 10. The constant output voltage VO is supplied by the power supply apparatus 10 to the loads. The individual LDO regulators 100a and 100b capable of converting the output voltage VO for respective loads are provided between the loads 110a and the power supply apparatus 10, and the loads 110b and the power supply apparatus 10, respectively. The LDO regulators 10a and 100b lower the output voltage VO from the power supply 10 according to need.

When the loads 110a and 110b are in a standby state, the power supply apparatus 10 supplies the output voltage VO using the LDO regulator 20. Power consumption is low and noise is not generated. When the loads 110a and 10b are operated and power is needed accordingly, the power supply 10 switches to the DC/DC converter 30 and supplies a large current to the loads 110a and 110b. With this construction, the stable output voltage VO is supplied to a plurality of loads and the loads are subject to independent control. Accordingly, highly efficient and stable power supply to battery-driven portable equipment such as a portable telephone and a PDA is possible. Since the DC/DC converter 30 of the power supply 10 is shared by the loads, the number of coils necessary to lower the voltage is minimized so that the package area is reduced.

Described above is the description based on the embodiment. The embodiment of the present invention is only illustrative in nature and it will be obvious to those skilled in the art that various variations in constituting elements and processes are possible within the scope of the present invention.

In the embodiment, the capability of the DC/DC converter 30 to suppress the output voltage VO is lowered by providing dead time by controlling the on duty period of the NMOS gate Tr2 of the DC/DC converter 30, thereby suppressing an undershoot. By lowering the capability of the DC/DC converter 30 to increase the output voltage VO by providing dead time by controlling the on duty period of the PMOS gate Tr1 of the DC/DC converter 30, an overshoot is suppressed. Regardless of whether an undershoot or an overshoot is to be suppressed, the capability of the DC/DC converter 30 to control the output voltage VO may be lowered using an overall approach by controlling the duty ratio of both the PMOS gate Tr1 and the NMOS gate Tr2.

There are a variety of methods to implement means to limit the capability of the DC/DC converter 30. Regardless of which method is used, a transient output variation that occurs immediately after switching from the LDO regulator 20 to the DC/DC converter 30 can be controlled by turning the DC/DC converter 30 "weakly on".

What is claimed is:

1. A power supply apparatus comprising:
   a series regulator that converts a power supply voltage into a first voltage to output the first voltage to a common output terminal;
   a switching regulator that converts the power supply voltage into a second voltage to output the converted voltage to the common output terminal;
   a common feedback unit that feeds a detected voltage at the common output terminal back to said series regulator and said switching regulator;
   a control terminal that inputs a switching control signal;
   a switching control unit that switchably puts said series regulator and said switching regulator into operation in response to the switching control signal; and
   a capability switching unit that controls the capability of said switching regulator to be lowered than normal in the beginning of its operation caused by said switching unit.

2. An electronic information appliance having power supply apparatus according to claim 1.

3. The power supply apparatus according to claim 1, wherein said switching control unit provides a period of time in which said series regulator and said switching regulator are concurrently operated in switching from said series regulator to said switching regulator.

4. The power supply apparatus according to claim 3, wherein said capability switching unit returns said switching regulator to a normal capability when the period of time for concurrent operation expires.

5. The power supply apparatus according to claim 4, wherein said capability controls unit switching the capability of said switching regulator by adjusting the on duty period of said switching regulator.

6. The power supply apparatus according to claim 4, wherein said switching control unit includes a timing signal generating unit receiving a switching control signal to control switching of said series regulator and said switching regulator and generating an on-off switching timing signal for said series regulator and a capability switching timing signal outputted to said capability switching unit for said switching regulator, and wherein
   when said timing signal generating unit receives the switching control signal designating switching from said series regulator to said switching regulator, said timing signal generating unit generates the on-off switching timing signal which turns said series regulator off when a predetermined period of time elapses since the input of the switching control signal, and generates the capability switching timing signal which switches said switching regulator from a low capability to a high capability when a predetermined period of time further elapses.

7. An electronic information appliance having power supply apparatus according to claim 4.

8. The power supply apparatus according to claim 5, wherein said switching control unit includes a timing signal generating unit receiving a switching control signal to control switching of said series regulator and said switching regulator and generating an on-off switching timing signal for said series regulator and a capability switching timing signal outputted to said capability switching unit for said switching regulator, and wherein
   when said timing signal generating unit receives the switching control signal designating switching from said series regulator to said switching regulator, said timing signal generating unit generates the on-off switching timing signal which turns said series regulator off when a predetermined period of time elapses since the input of the switching control signal, and generates the capability switching timing signal which switches said switching regulator from a low capability to a high capability when a predetermined period of time further elapses.

9. The power supply apparatus according to claim 6, wherein said capability switching unit starts said switching regulator in a low capability mode by providing a delay for a turn-on-timing of said switching regulator, when said timing signal generating unit receives the switching control signal, and switches from a low capability to a normal capability by canceling the delay for the turn-on-timing of the switching regulator, when said timing signal generating unit generates the capability switching timing signal.

10. The power supply apparatus according to claim 8, wherein said capability switching unit starts said switching regulator in a low capability mode by providing a delay for a turn-on-timing of said switching regulator, when said timing signal generating unit receives the switching control signal, and switches from a low capability to a normal capability by canceling the delay for the turn-on-timing of the switching regulator, when said timing signal generating unit generates the capability switching timing signal.

11. A power supply control method comprising:
   receiving, from a control terminal, a switching control signal which designates switching from a series regulator that converts a power supply voltage into a first voltage to output the first voltage to a common output terminal, to a switching regulator that converts the power supply voltage into a second voltage to output the second voltage to the common output terminal;
   turning said switching regulator on with a capability lower than normal when the switching control signal is received;
   turning said series regulator off when a predetermined period of time elapses since the generation of the switching control signal; and
   switching said switching regulator from a low capability to a normal capability when a predetermined period of time elapses since the turning said series regulator off.

12. The power supply control method according to claim 11, wherein the capability of said switching regulator is controlled by adjusting an on duty period of said switching regulator.

13. The power supply control method according to claim 11, wherein, in the turning said switching regulator on with a capability lower than normal, said switching regulator is started with a low capability by providing a delay for a turn-on-timing of said switching regulator, and wherein, in the switching said switching regulator from a low capability to a high normal capability, switching from a low capability to a normal capability is effected by canceling the delay for the turn-on-timing of the switching regulator.

* * * * *